May 10, 1955  J. BIBBY  2,707,995
APPARATUS FOR MAKING FINE MESH EXPANDED MATERIAL
Filed Aug. 29, 1952  5 Sheets-Sheet 1

INVENTOR.
JAMES BIBBY

INVENTOR.
JAMES BIBBY

May 10, 1955 J. BIBBY 2,707,995
APPARATUS FOR MAKING FINE MESH EXPANDED MATERIAL
Filed Aug. 29, 1952 5 Sheets-Sheet 3

INVENTOR.
JAMES BIBBY
BY [signature]
ATTORNEY

May 10, 1955 J. BIBBY 2,707,995
APPARATUS FOR MAKING FINE MESH EXPANDED MATERIAL
Filed Aug. 29, 1952 5 Sheets-Sheet 4
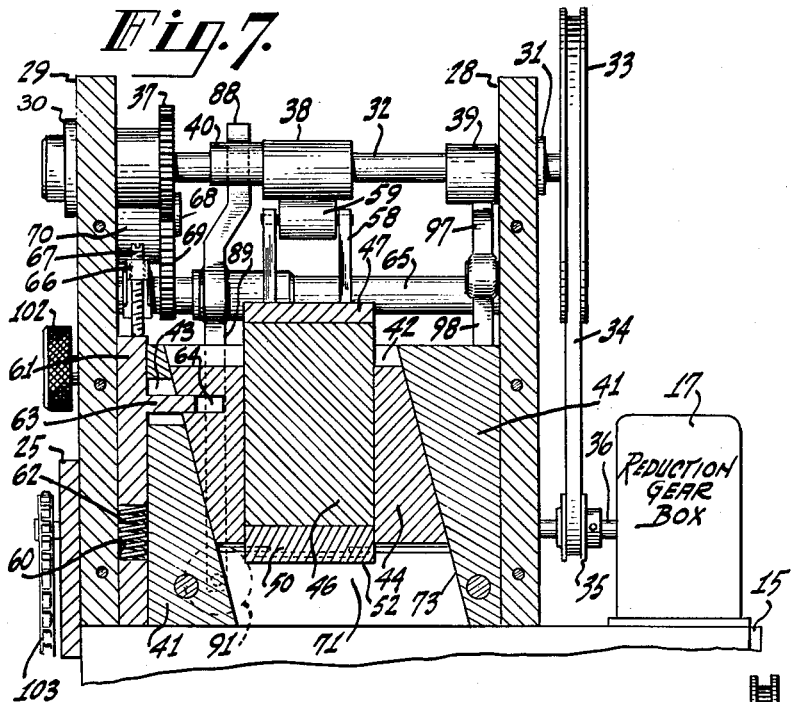
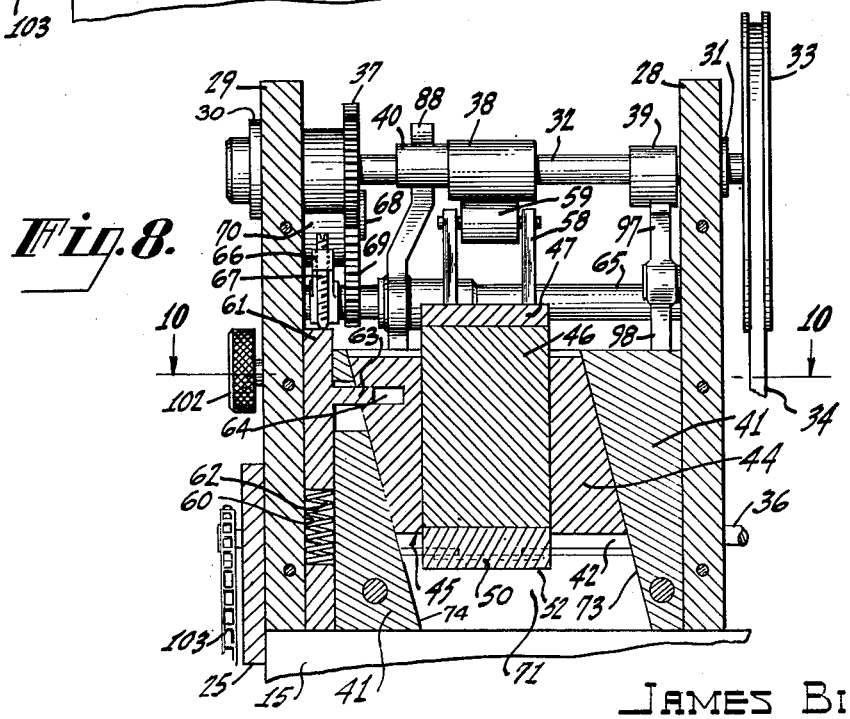
INVENTOR.
JAMES BIBBY May 10, 1955   J. BIBBY   2,707,995
APPARATUS FOR MAKING FINE MESH EXPANDED MATERIAL
Filed Aug. 29, 1952   5 Sheets-Sheet 5
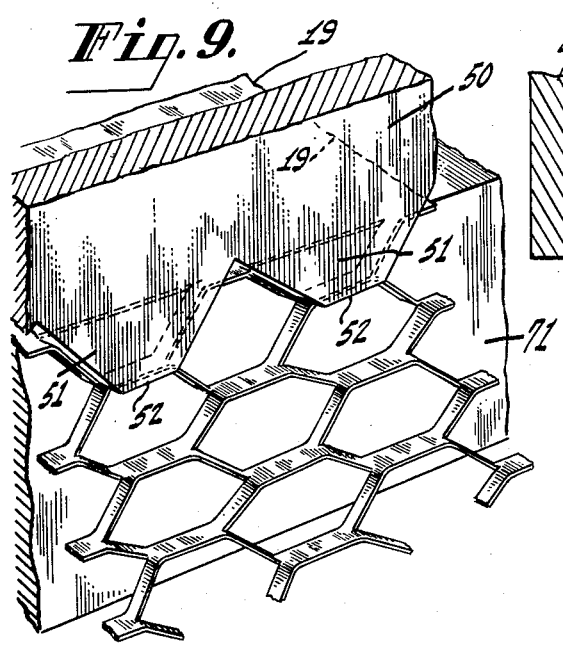
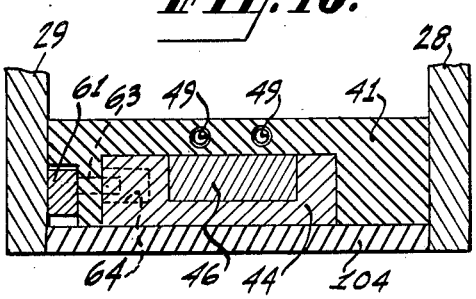
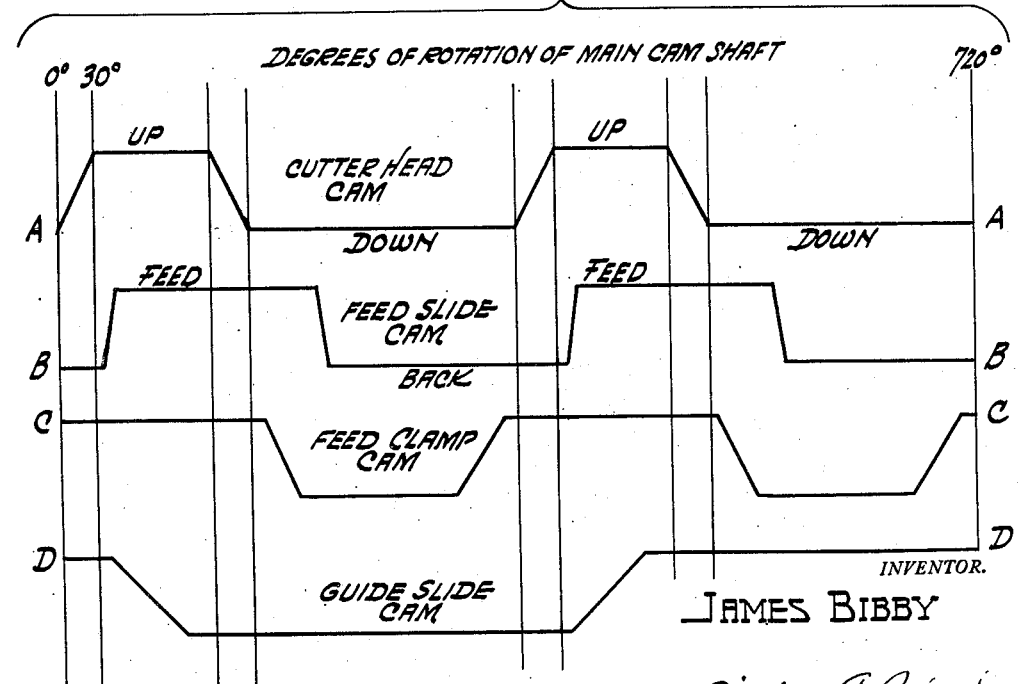
INVENTOR.
JAMES BIBBY

United States Patent Office 2,707,995
Patented May 10, 1955

2,707,995

APPARATUS FOR MAKING FINE MESH EXPANDED MATERIAL

James Bibby, Newark, N. J., assignor to Radio Corporation of America, a corporation of Delaware Application August 29, 1952, Serial No. 307,111

9 Claims. (Cl. 164—6.5)

This invention relates to apparatus for making fine mesh expanded material and more particularly to an apparatus for simultaneously slitting and expanding thin, flexible sheet material such as metal foil or the like.

A principal object of my invention is to provide such an apparatus which operates with precision for long periods of operation and without causing undesirable deformation or tearing of the sheet material.

Another object is the provision of a highly dependable yet simple apparatus in which successive off-set slits are made by the same cutting edge, thereby insuring a high degree of uniformity, and which may be readily adapted so as to produce expanded material having a mesh width as desired by ready adjustment of the length of the feed stroke.

In carrying out a preferred embodiment of my invention I provide a slitting and punching means including a cutting head mounted to reciprocate in a guide-way formed in a guide slide. The guide slide itself is mounted to reciprocate in a guide-way disposed at an angle to the guide-way provided for the cutting head. Thus, as the guide slide reciprocates in its guide-way the cutting head is displaced with respect to the work. The device is so constructed and arranged that successive portions of the work which have been slit and expanded are offset or in staggered relation to the next preceding row of slit and expanded portions of the work.

Still other objects will appear as the nature of my invention is more fully understood from the following description taken in conjunction with the accompanying drawing wherein:

Figure 7 is a sectional view along the line 7—7 of Figure 1 on an enlarged scale;

Figure 8 is a similar view showing the effect on the cutting head when the guide slide is in its raised position;

Figure 9 is a perspective view of a portion of the finished work as it leaves the cutting head, a portion of which is also shown;

Figure 10 is a sectional view along the line 10—10 of Figure 8; and

Figure 11 is a diagram showing the sequential operation of the various operating cams and their associated parts.

General description

Figure 1:
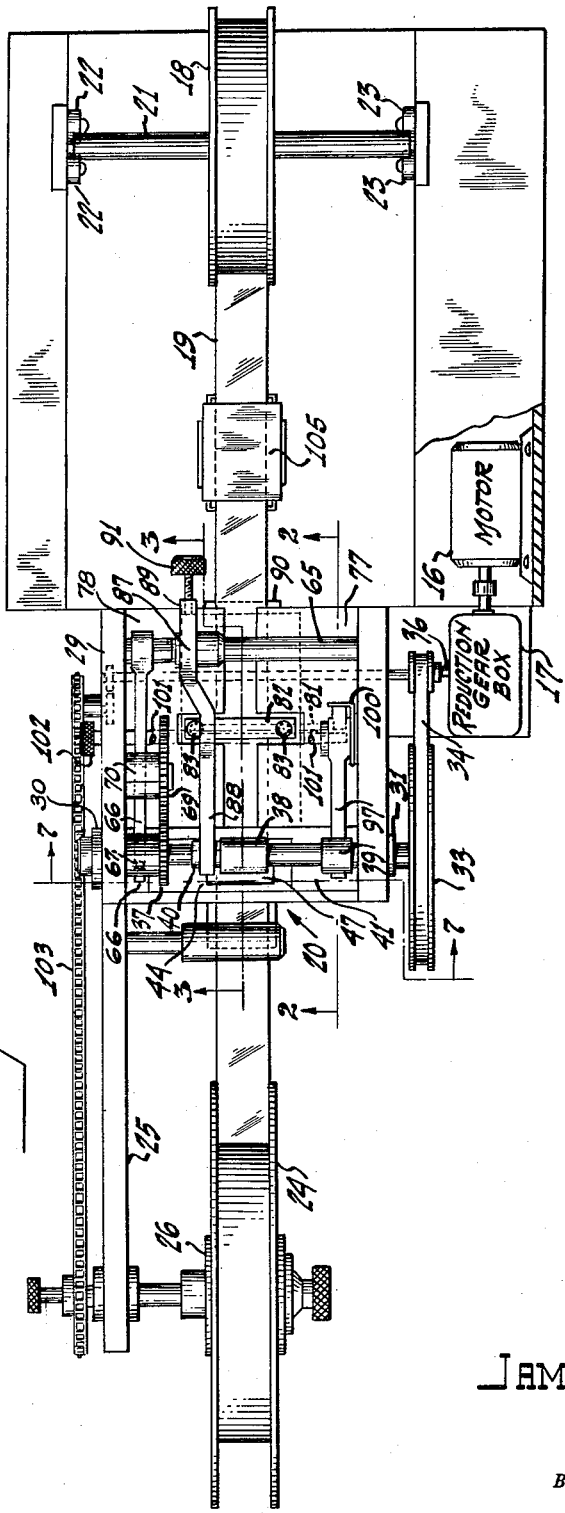
Figure 1 is a plan view of an apparatus constructed in accordance with my invention.

The preferred embodiment of my invention illustrated in the accompanying drawings may be supported on any convenient means such as a supporting member 15 and comprises (Figure 1) a suitable source of power such as electrically driven motor 16 connected to reduction gear box 17. Gear box 17, as will be hereinafter described in greater detail, by means of suitable pulleys and belts serves to drive the various movable parts of the device including a feed system and a work take-up means.

A supply spool 18 is also supported on support member 15 in position to facilitate the work material 19 to be drawn therefrom and to be fed through slitting and expanding means indicated generally by arrow 20. Supply spool 18 may be carried by a rod 21 supported at each end thereof by a pair of rolls 22, 23. Take-up spool 24 is supported by arm 25 on the side of slitting and expanding means 20 away from supply spool 18 and is connected through friction clutch 26, and other suitable members to gear box 17. For the sake of clarity and to facilitate an understanding of the relationship of the various parts forward, or forwardly, direction will be used herein to refer to the direction in which the work is fed.

Slitting and punching means

Figure 2:
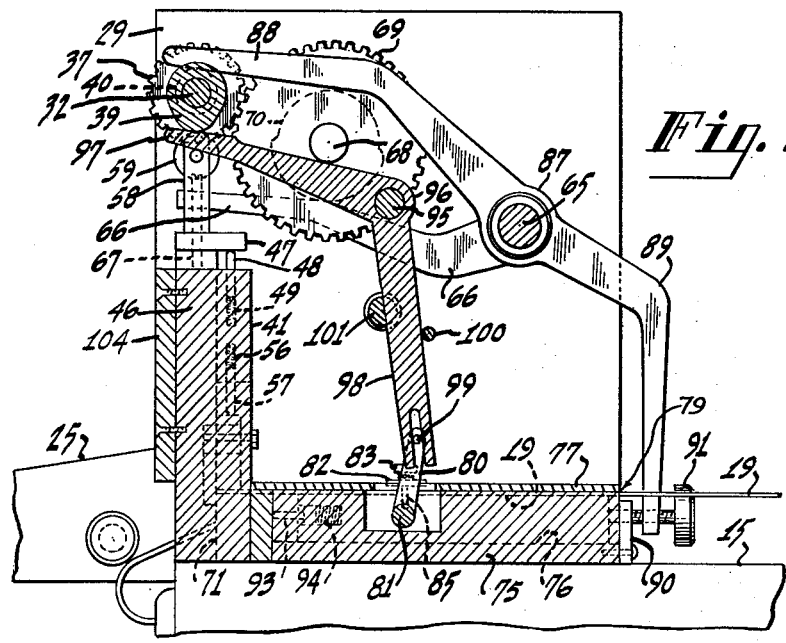
Figure 2 is a sectional view thereof through the line 2—2 of Figure 1 on an enlarged scale.
Figure 3:
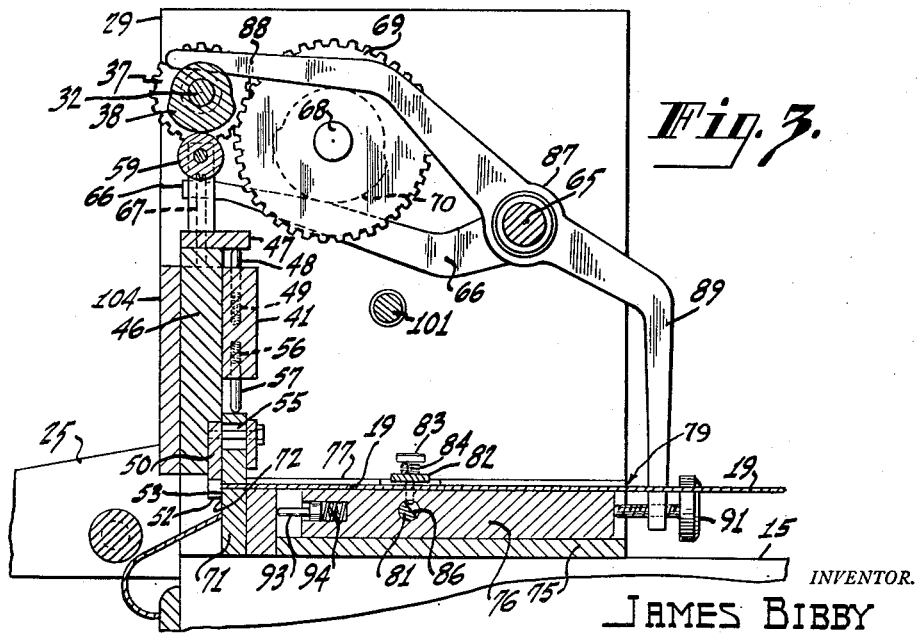
Figure 3 is a sectional view thereof through the line 3—3 of Figure 1 on an enlarged scale.

Referring now to Figures 2, 3 and 7 in detail, initially the latter, a pair of spaced side plates 28, 29 are supported in fixed relation from support member 15 and carry bushings 30, 31 adjacent one end thereof, conveniently the upper ends as viewed in the drawings. Bushings 30, 31 support rotatable cam shaft 32 which extends through side plate 28. The end of cam shaft 32 extending through side plate 28 carries a pulley 33 which is connected by belt 34 to pulley 35 mounted to rotate with drive shaft 36. Drive shaft 36, in turn, is connected to the output end of gear box 17. As is most clearly shown in Figure 8, cam shaft 32 carries a plurality of cams as well as drive gear wheel 37. One such cam is cutting head operating cam 38 which for convenience is centrally located on cam shaft 32 intermediate side plates 28, 29. Additionally, cam shaft 32 carries mounted thereon feed clamp cam 39 and feed slide cam 40.

Mounted below cam shaft 32 and also between side plates 28, 29 is fixed or immovable guide member 41 having a guide-way 42 formed therein. As is clearly shown in Figures 7 and 8 guide-way 42 extends at an angle to the vertical as viewed therein. Guide member 41 has a passageway or slot 43 formed therein which opens into guide-way 42. Guide slide 44 is slidably mounted in guide-way 42 and has guide-way 45 formed therein in the form of a substantially U-shaped recess which is closed along its open side by guide member 41 and open at its ends.

Figure 4:
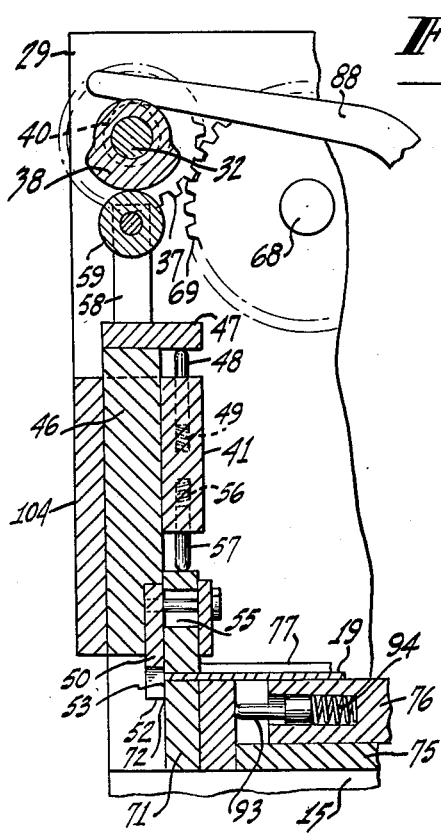
Figure 4 is a fragmentary sectional view of a portion of Figure 3 on a still further enlarged scale.
Figure 6:
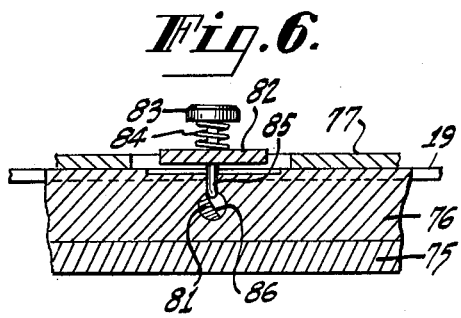
Figure 6 is a fragmentary sectional view through the line 6—6 of Figure 5 with the clamp now disengaged from the work.

Slidably mounted in guide-way 45 between guide member 42 and guide slide 44 is slide block 46 which extends upwardly through guide way 45. A projecting member or portion 47, integral with slide block 46 or connected thereto, as desired, extends rearwardly toward the supply spool and overhangs a portion of the upper end of guide member 41 so as to intercept two upwardly presented spring loaded plungers 48, one of which may most clearly be seen in Figure 4, mounted in a recess in the upper end wall of guide member 41. Each plunger 48 is backed by a spring 49 which is retained in the recess by its associated plunger. As shown in Figure 4, the lower end of slide block 46 carries cutting head 50 which is set into an undercut portion of slide block 46 with the rearwardly presented surfaces of cutting head 50 and slide block 46 lying in the same vertical plane. Cutting head 50 extends downwardly below the lower end of slide block 46 and has a single row of a plurality of spaced apart teeth 51. As is clearly shown in Figure 9 teeth 51 are tapered but are not brought to a "V" shape on the lower surface but flattened as at 52 as will be more specifically pointed out herein below.

Also connected to slide block 46 and in sliding engagement with slide block 46 and cutting head 50 is a clamp 54 in the form of an elongated bar having elongated holes 55 formed therethrough. Clamp 54 is bolted to sliding block 46 as shown and is urged downwardly by spring 56 mounted in guide member 41 and acting through plunger 57 which serves as a retainer for spring 56 and engages an upwardly presented surface of clamp 54.

A yoke 58 is mounted on the upwardly presented surface of projecting member or portion 47 on slide block 46. That is to say, as clearly shown in Figure 4, yoke 58 is mounted on the surface of slide block 46 presented toward cam shaft 32 and supports rotatably mounted roll 59 which is in rolling engagement with cam 38.

Referring now to Figures 7, 8 and 10, it may be seen that guide member 41 is recessed so as to form an elongated, open ended, channel 60 with side plate 29 and face plate or retainer 104; the latter being connected as shown to side plates 28, 29 and serving as a retainer as well as presenting a slide surface for guide slide 44. An elongated follower 61 is slidably mounted in channel 60 and is biased toward one end of channel 60, upwardly as viewed in the drawings by a spring 62 which abuts support member 15. Follower 61 carries an elongated finger 63 so positioned as to extend through passageway or slot 43 and engages guide slide 44 by seating in a recess 64 formed in guide slide 44 and opening into slot 43. From Figures 7 and 8 it is apparent that slot 43 is so dimensioned as to accommodate the reciprocating movement of finger 63.

Rearwardly of cam shaft 32 and displaced somewhat below the same, shaft 65 is supported by side plates 28, 29 and extends therebetween. A guide slide operating lever 66 is rotatably mounted on shaft 65 adjacent side plate 29 and is sufficiently elongated so as to overhang follower 61. Lever 66 is conveniently tapped adjacent its free end and carries a set screw threaded therethrough so as to abut the end of follower 61. Thus, the biasing action of spring 62 is transmitted to the free end of lever 66.

A stub shaft 68 is journaled into side plate 29 and carries rotatably mounted gear wheel 69 which meshes with drive or pinion gear wheel 37 and is driven by the same. The ratio of gear wheels 37 and 69 is such that gear wheel 37 makes two complete revolutions for each revolution of gear wheel 69. A guide slide cam 70 is also rotatably mounted on stub shaft 68 and is rotatable with gear wheel 69. Cam 70 is so positioned as to ride on the upwardly presented surface of guide slide operating lever 66 intermediate the ends thereof as shown.

A stationary or fixed cutter 71 is bolted to side plates 28, 29 and is positioned so as to present a cutting edge 72 (Figure 3) which cooperates with the cutting edge 53 of cutting head 50. Side portions 73, 74 of guide member 41 (Figure 8) extend downwardly below cutting edge 53 and are bolted to the forwardly presented surface of fixed cutter 71.

*Feed means*

Figure 5:
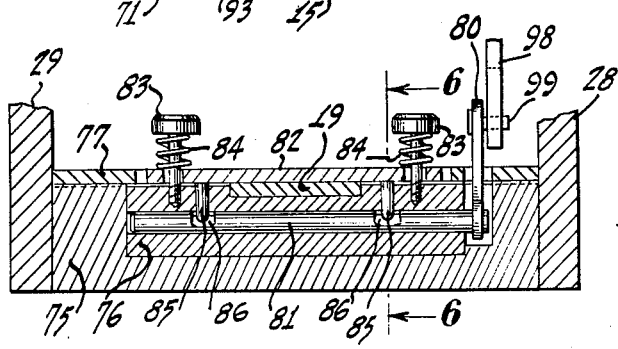
Figure 5 is a fragmentary sectional view of the feed clamp and operating means therefor shown in Figure 1 and on an enlarged scale.

Resting on support member 15 is a feed slide support member 75, bolted to side plates 28, 29, having a channel formed therein and having two upwardly extending portions (Figure 5). Feed slide 76 is slidably mounted in the channel formed in feed slide support member 75 and has a feed channel formed in its upwardly presented surface. A pair of guide plates 77, 78 are each connected to one of the upwardly extending side portions of member 75 and rest on portions of feed slide 76; the latter being in sliding engagement therewith. Guide plates 77, 78 also partly overhang the feed channel in feed slide 76 so as to form a feedway 79 with feed slide 76. Feed slide support member 75 and guide plates 77, 78 extend to fixed cutter 71 with guide plates 77, 78 notched or cut away so as not to interfere with the action of clamp 54.

Feed slide support member 75 is bored, Figure 5, to permit crank 80 to extend downward therein to a rod 81 rotatably mounted in a hole bored in feed slide 76. Crank 80 is connected to rod 81 so that movement of crank 80 is imparted to rod 81. Feed clamp 82, in the form of an elongated bar, extends across feedway 79 and is connected to feed slide 76 by bolts 83; guide plates 77, 78 being notched (Figure 1) to permit the entrance and movement of feed clamp 82. Also, feed slide 76 is recessed below feed clamp 82 to permit clamp 82 to engage the work when the clamp is in its downward or clamping position (Figure 7). Springs 84 are mounted on bolts 83 and urge feed clamp 82 downward, the latter being slidable on bolts 83. A pair of pins 85 are seated against the under-surface of feed clamp 82 and extend through holes bored in feed slide 76 and are in position to be forced upward, against the action of springs 84, by flat surfaces 86 formed on rod 81 intermediate the ends thereof. It will be noted that the holes in feed slide 76 in which pins 85 are slidable open into the hole in which rod 81 is mounted.

Referring now to Figures 2 and 3, a feed slide operating lever 87 is rotatably mounted on the shaft 65 supported from side plates 28, 29. Lever 87 has a forwardly extending weight arm 88 which rides on feed slide cam 40 as well as a downwardly extending power arm 89. Power arm 89 of lever 87 is tapped at its lower end to receive set screw 91 which is in threaded engagement therewith. A stop 90 is connected to feed slide support member 75 and limits the rearward travel of feed slide 76. With feed slide 76 abutting stop 90 and set screw 91 unscrewed sufficiently so as not to engage the rear end of feed slide 76 when power arm 89 is in its forward position it is apparent that there will be no forward movement of feed slide 76. As set screw 91 is threaded more and more through power arm 89, more and more of the forward movement of power arm 89 is transmitted to feed slide 76 until the longest feed stroke corresponding to the full throw of power arm 89 is attained.

It is to be noted that a pair of springs 94, one being shown in Figures 2, 3 and 4, are seated in recesses formed in feed slide 76 and through plungers 93 urge feed slide 76 rearwardly.

A second rotatable stub shaft 95 is journaled into side plate 28 and has mounted thereon a feed clamp operating lever 96 having a weight arm 97 extending under feed clamp cam 39 and a power arm 98 extending downwardly. The lower end of power arm 98 (Figure 5) has a yoke formed therein and engages pin 99 projecting from crank 80 and connected thereto. A spring 100 is wound on stub shaft 95 and, as shown, engages power arm 98 so as to urge the forward end of weight arm 97 upwardly against cam 39 while the lower end of power arm 98 connected to crank 80 by pin 99 is urged in a forwardly direction.

Since feed clamp 82 and clamp 54 alternately clamp the work, rod 101 is conveniently supported by side plates 28, 29 and carries a finger piece 102 (Figure 7). Rod 101 has a flat surface engaging lever 96 when power arm 98 is in its forward position (Figure 2). Thus, rotation of rod 101 forces power arm 98 rearwards rocking crank 80 and rotating rod 81 to raise clamp 82. This permits freeing the work when slide block 46 is in its raised position and clamp 82 normally engages the work.

Operation

It is believed that a full understanding of the operation of my apparatus may most readily be had from a consideration of the action of the various cams which is shown diagrammatically in Figure 11. In the diagram the action of the cams is shown as a function of the rotation of the main cam shaft 32 in degrees. Starting with cutting head 50 in its downward position, engaging the work as shown in Figure 9 and at the instant cutting head 50 starts to rise, the corresponding setting of cam shaft 32 may be considered as a zero setting. Cam shaft 32 rotates counterclockwise and from curve A, Figure 11, it is seen that the heel of cam 38 is in engagement with roll 59 permitting slide block 46 carrying cutting head 50 to rise under the influence of plungers 48 and springs 49. While roll 59 is riding the dwell of cam 38, feed slide operating lever 87 is actuated by feed slide cam 40 and drives feed slide 76 forward compressing springs 94. Simultaneously with the foregoing forwardly movement of feed slide 76, feed clamp 82 has been in clamping engagement with the work. Feed clamp 82 is in its downward position and urged against the work by springs 84, while slide block 46 and cutting head 50 are out of engagement with the work. The foregoing action of the feed slide cam 40 and feed clamp 39 are shown by curves B and C, respectively, of Figure 11.

Continued rotation of cam shaft 32 brings the toe of cam 38 to roll 59 and slide block 46 is forced downwards compressing springs 49. When the cutting head 50 carried by slide block 46 has reached the downward end of its travel, the toe of feed clamp cam 39 engages the weight arm 97 of feed clamp operating lever 96 forcing the lever to rotate on stub shaft 95, thereby swinging power arm 98 to rock crank 80 and thereby rotate rod 81. This action rotates flat surfaces 86 on rod 81 which in turn force pins 85 upwards. Pins 85 being seated against the under surface of feed clamp 82 urge the same upwards compressing springs 84. The feed clamp 82 is now out of engagement with the work.

Further rotation of main cam shaft 32 brings the heel of feed slide cam under the weight arm of feed slide operating lever 87 permitting lever 87 to rotate on shaft 85. Feed slide 76 being urged rearwardly by springs 94 travels rearwardly until it abuts stop 90 as the heel of feed slide cam 40 permits the weight arm of said slide operating lever 96 to drop.

It may be noted at this time that while slide block 46 is in its downward position, clamp 54 engages the work and under the influence of spring 56 and plunger 57 clamps the work against the upwardly presented surface of stationary cutter 71. Thus as feed slide 76 travels rearwardly and feed clamp 82 is raised, the work is held stationary by clamp 54.

It will be noted from curves B and C that after the full rearward movement of feed slide 76, the heel of feed clamp cam 39 rocks lever 96, crank 80 and rod 81 to permit feed clamp 82 to be forced downwards by springs 84 and reclamp the work. Now main cam shaft 32 has rotated 360 degrees and the cyclic movement of the foregoing operating members continues as previously described.

As was pointed out hereinabove, guide slide cam 70 is mounted to rotate with gear wheel 69 which makes one complete revolution for two revolutions of pinion 37. Thus the frequency of operation of guide slide operating lever 66 is one-half that of the members actuated by main cam shaft 32. By referring to curve D of Figure 14 it is apparent that guide slide 44 is operated on alternate strokes of slide block 46. At the beginning of the cycle when slide block 46 and cutter head 50 rise, guide slide 44 is stationary. After guide slide 46 has reached the top of its stroke, the toe of guide slide cam 70 comes into contact with lever 66 and forces lever 66 downwards. This downward movement of lever 66 is transmitted through set screw 67 to follower 61 compressing spring 62. Finger 63 on follower 61 being in engagement with guide slide 44 forces guide slide 44 downwards. By reference to Figures 7 and 8, it is seen that downward movement of guide slide 44 imparts a sidewards or horizontal motion to slide block 46. The dwell of guide cam 70 is sufficiently long to maintain guide slide 44 in its downward position while main cam shaft 32 completes its revolution and until slide block 46 is once again in its raised position, at which time the heel of guide slide cam 70 permits guide slide operating level 66 to rise. When lever 66 is free to rise, follower 61, under the influence of spring 62, rises carrying guide slide 44 upwards with it.

As is apparent from Figure 1, take-up spool 24 is driven through friction clutch 26 by an endless chain 103, which is in turn driven by drive shaft 36. Friction clutch 26 is so arranged that only a sufficient pull is exerted by take-up spool 24 as is necessary to wind on the worked material and substantially without tensioning the same. The pitch of teeth 51 (Figure 9) and the sidewards displacement of cutting head 50 are readily proportioned so that the worked material has a mesh as shown. The combined horizontal motion imparted by the feed mechanism and vertical motion imparted by cutting head 50 results in the expansion of the worked material along a plane which is at an angle to the plane in which the work is fed through the apparatus. The thickness of the interconnecting strands of the mesh in the worked material is readily controlled by adjusting set screw 91 which in turn regulates the length of the feed stroke. By providing cutting head 50 with flatting teeth having a flat surface as at 52 (Figure 9) rather than V-shaped teeth, slitting and punching take place simultaneously or with the same stroke of the cutting head. Thus as cutting edge 53 is slitting the work, flat surface 52 expands the same by forcing a portion of the work downwards.

One important advantage to my apparatus is that by utilizing the same teeth to form the successively offset slit and punched portions of the work, a high degree of precision is obtainable and the resulting slit and expanded mesh material formed is uniform to an extremely high degree. A very fine mesh material may readily be made with my apparatus. The worked material may be of a foil-like thickness and as thin as desired. For example, it may be approximately two mills in thickness while the width of the mesh of the worked material may vary as desired from as little as one mill to as large as may be desired.

It should also be noted that oiler 105 is located between supply spool 18 and the slitting and expanding means 20.

I claim:

1. An apparatus for slitting and expanding sheet material, comprising a support, a guide member connected to said support and having a guide-way formed therein extending in a given direction, a guide slide reciprocatingly mounted in said guide-way and having another guide-way formed therein with its axis forming a relatively small acute angle with the axis of the guide-way formed in said guide slide member, a cutting head reciprocatingly mounted in said other guide-way, and means for reciprocating said guide slide at a given cyclic rate and said cutting head at a second cyclic rate which is greater than said given rate whereby said cutting head is cyclicly displaced at said given cyclic rate in a direction normal to the axis of said other guide-way.

2. An apparatus for slitting and expanding sheet material, comprising a support, a guide member connected to said support and having a guide-way formed therein, a guide slide reciprocatingly mounted in said guide-way and having another guide-way formed therein, a cutting head reciprocatingly mounted in said other guide-way, said guide-ways extending in parallel planes with their axes forming a relatively small acute angle, and means for reciprocating said guide slide at a given cyclic rate and said cutting head at a cyclic rate which is twice as rapid as said given rate whereby said cutting head is cyclicly displaced perpendicular to the axis of said other guide-way at said given rate when guide slide is reciprocated in its guide-way.

3. An apparatus for slitting and expanding sheet material, comprising a support, a feed slide support member connected to said support and having a guide-way formed therein extending in a plane, a feed slide slidably mounted in said feed slide support member, means for reciprocating said feed slide in said guide-way, a guide member connected to said support and having a guide slide guide-way formed therein, a guide slide movably mounted in said guide slide guide-way, said guide slide having a guide-way formed therein, a cutting head movably mounted in said last mentioned guide-way, said last two mentioned guide-ways extending at a relatively small acute angle with respect to each other and in a plane which intersects the plane of said first mentioned guide-way, and means for reciprocating said guide slide and said cutting head whereby said cutting head is laterally displaced with respect to said first mentioned guide-way when said guide slide is reciprocated in its guide-way.

4. An apparatus for slitting and expanding sheet material, comprising a support, a feed slide support member connected to said support and having a guide-way formed therein, a feed slide slidably mounted in said feed slide support member, a guide member connected to said support and having a second guide-way formed therein, a guide slide slidably mounted in said second guide-way, a cutting head slidably mounted in a third guide-way formed in said guide slide, a plurality of cams rotatably mounted on said support one for each of said slidably mounted members, means operatively connecting each of said cams with its corresponding slidably mounted member, means for rotating said cams associated with said feed slide and said cutting head at a given rate, and means for rotating said cam associated with said guide slide at a rate slower than said given rate.

5. An apparatus for slitting and expanding sheet material, comprising a support, a feed slide support member connected to said support and having a guide-way formed therein, a feed slide slidably mounted in said feed slide support member, a feed clamp movably mounted on said feed slide and movable therewith, a guide member connected to said support and having a second guide-way formed therein, a guide slide slidably mounted in said second guide-way, a cutting head slidably mounted in a third guide-way formed in said guide slide, a second clamp slidably connected to said cutting head and movable therewith, a resilient means in contact with said guide member and urging said second clamp in one direction, a plurality of cams rotatably mounted on said support one for each of said slidably mounted members and said feed clamp, means operatively connecting each of said cams with its corresponding member, means for rotating said cams associated with said feed slide and said cutting head and said feed clamp at a given rate, and means for rotating said cam associated with said guide slide at a rate slower than said given rate, and means operatively interconnecting said feed clamp and said cutting head respectively with its associated cams being so constructed and arranged that said feed clamp and said second clamp alternately engage the sheet material.

6. An apparatus for slitting and expanding sheet material, comprising a support, a feed slide support member connected to said support and having a guide-way formed therein, a feed slide slidably mounted in said feed slide support member, a guide member connected to said support and having a second guide-way formed therein, a guide slide slidably mounted in said second guide-way, a cutting head slidably mounted in a third guide-way formed in said guide slide, a stationary cutter having a cutting edge and connected to said supports, said cutting head having a plurality of teeth alined in a single row and presenting a cutting edge for coaction with said first mentioned cutting edge, said teeth also forming a plurality of spaced apart punching surfaces, a plurality of cams rotatably mounted on said support one for each of said slidably mounted members, means operatively connecting each of said cams with its corresponding slidably mounted members and for intermittently moving the same and moving said cutting head toward and away from said stationary cutter in a given plane, said guide slide and said guide member being so constructed and arranged that movement of said guide slide imparts movement to said cutting head in a plane normal to said given plane, means for rotating said cams associated with said feed slide and said cutting head at a given rate, and means for rotating said cam associated with said guide slide at a rate slower than said given rate, said cams being so constructed and arranged that movement is imparted to said guide slide only when said cutting head is away from said stationary cutter.

7. An apparatus for slitting and expanding sheet material, comprising a support, a feed slide movably mounted on said support, a cutting head movably mounted on said support, means for reciprocating said cutting head in one plane at given frequency and in another plane at a lower frequency, means for reciprocating said feed slide at said given frequency comprising a rotatably mounted cam, an elongated feed slide lever pivotably mounted on said support intermediate the ends thereof, said lever adjacent one end thereof being in close spaced relation with said cam, a stop on said support, resilient means urging said feed slide against said stop, and adjustable means connected to said lever adjacent the other end thereof and engaging said feed slide, adjustment of said adjustable means varying the spacing between said lever and said cam.

8. An apparatus for slitting and expanding sheet material, comprising a support, a feed slide support member connected to said support and having a guide-way formed therein, a feed slide slidably mounted in said feed slide support member, a guide member connected to said support and having a second guide-way formed therein, a guide slide slidably mounted in said guide-way, a cutting head slidably mounted in a third guide-way formed in said guide slide, a plurality of cams rotatably mounted on said support one for each of said slidably mounted members, means operatively connecting each of said cams with its corresponding slidably mounted member including an elongated feed slide lever pivotably mounted intermediate the ends thereof on said support with one portion in close spaced relation with the cam associated with said feed slide and for engaging the same as well as readily adjustable means connected to said lever adjacent the other end thereof and engaging said feed slide, a stop on said support, resilient means urging said feed slide against said stop, whereby adjustment of said adjustable means changes the spacing between said feed slide lever and the cam associated with said feed slide and thereby the travel of said feed slide, means for rotating said cams associated with said feed slide and said cutting head at a given rate, and means for rotating said cam associated with said guide slide at a rate slower than said given rate.

9. An apparatus for slitting and expanding sheet material, comprising a support, a feed slide support member connected to said support and having a guide-way formed therein, a feed slide slidably mounted in said feed slide support member, a guide member connected to said support and having a second guide-way formed therein, a guide slide slidably mounted in said second guide-way, a cutting head slidably mounted in a third guide-way formed in said guide slide, the axes of said second and third guide-ways forming a relatively small acute angle, a plurality of cams rotatably mounted on said support one for each of said slidably mounted members, means operatively connecting each of said cams with its corresponding slidably mounted member, means for rotating said cams associated with said feed slide and said cutting head at a given rate, and means for rotating said cam associated with said guide slide at a rate slower than said given rate whereby said cutting head is laterally displaced with respect to said first mentioned guide-way at said slower rate when said guide slide is reciprocated.

References Cited in the file of this patent

UNITED STATES PATENTS

| | | |
|---|---|---|
| 819,484 | White | May 1, 1906 |
| 821,685 | White | May 29, 1906 |
| 885,815 | Wendell | Apr. 28, 1908 |
| 2,244,305 | McNeil et al. | June 3, 1941 |
| 2,512,802 | Koskinen | June 27, 1950 |